(12) United States Patent
Godkin

(10) Patent No.: US 6,831,538 B2
(45) Date of Patent: Dec. 14, 2004

(54) LINEAR VOICE COIL ACTUATOR AS A CONTROLLABLE ELECTROMAGNETIC COMPRESSION SPRING

(75) Inventor: Mikhail Godkin, San Diego, CA (US)

(73) Assignee: BEI Sensors and Systems Company, Inc., Sylmar, CA (US)

( * ) Notice: Subject to any disclaimer, the term of this patent is extended or adjusted under 35 U.S.C. 154(b) by 0 days.

(21) Appl. No.: 10/406,099

(22) Filed: Apr. 2, 2003

(65) Prior Publication Data

US 2004/0027221 A1 Feb. 12, 2004

Related U.S. Application Data

(60) Provisional application No. 60/369,401, filed on Apr. 2, 2002.

(51) Int. Cl.[7] .............................................. H01F 7/088
(52) U.S. Cl. ...................................................... 335/222
(58) Field of Search ................................. 335/148–150, 335/220, 222–224, 229–235; 381/412, 420, 421, 422; 310/13

(56) References Cited

U.S. PATENT DOCUMENTS

| | | | |
|---|---|---|---|
| 3,836,733 A | * | 9/1974 | Cragg ........................ 381/418 |
| 4,071,042 A | | 1/1978 | Lombard et al. ........... 137/332 |
| 4,439,700 A | | 3/1984 | Menzel et al. ................ 310/13 |
| 5,345,206 A | | 9/1994 | Morcos ....................... 335/222 |

FOREIGN PATENT DOCUMENTS

| | | | | |
|---|---|---|---|---|
| EP | 1 001 512 A2 | 11/1999 | ......... | H02K/41/035 |
| JP | 57190403 | 10/1982 | .......... | H02K/33/18 |
| WO | WO 03/026345 A2 | 3/2003 | | |

OTHER PUBLICATIONS

International Search Report mailed Aug. 27, 2003.

\* cited by examiner

*Primary Examiner*—Ramon M. Barrera
(74) *Attorney, Agent, or Firm*—Gray Cary Ware & Freidenrich LLP

(57) ABSTRACT

Disclosed is a linear actuator, controllable as a spring, having a field assembly and a coil assembly positioned for interaction with and movement relative to the field assembly. The field assembly has a soft magnetic housing having an axis, axially magnetized cylindrical magnets and soft magnetic pole pieces which form a stack of alternating cylindrical magnets and pole pieces positioned along the axis. The coil assembly includes a coil base having coil cavities, coils supported in the coil cavity, and an axially magnetized permanent magnet positioned on the coil base so that the axially magnetized permanent magnet is positioned to travel along the axis of the soft magnetic housing. A repulsion force is generated between the coil assembly and the field assembly when the coil assembly is de-energized, and the repulsion force is modified when the coil assembly is energized.

12 Claims, 2 Drawing Sheets

LINEAR VOICE COIL ACTUATOR AS A CONTROLLABLE ELECTROMAGNETIC COMPRESSION SPRING

RELATED APPLICATIONS

The present application claims priority under 35 U.S.C. §119(e) from provisional application No. 60/369,401, filed Apr. 2, 2002.

TECHNICAL FIELD

The present invention is directed generally to linear voice coil actuators, and in particular to linear voice coil actuators operating as controllable electromagnetic compression springs.

BACKGROUND ART

A typical linear voice coil actuator 1 depicted, for example, in a one-half longitudinal cross section view in FIG. 1, consists of a field assembly 2 and a coil assembly 3. Field assembly 2 is comprised of an axially magnetized cylindrical magnet 4, soft magnetic pole piece 5 and soft magnetic housing 6. Coil assembly 3 consists of a coil 8, located in the circular cavity of the coil base 7. The coil assembly 3, when de-energized, does not have a preferred position to go to. If, on the other hand, after being de-energized, a coil has to move away from the field assembly, then some kind of feature providing repulsion force has to be present. This repulsion force is typically provided by a mechanical spring. The predictability of the characteristics of the repulsion force are therefore dependent upon and subject to the variations in mechanical characteristics of the spring. It is therefore desirable to have a linear voice coil actuator having a repulsion force which is not subject to the variations in mechanical characteristics of a mechanical spring.

SUMMARY OF THE INVENTION

The present invention provides a linear actuator that can be considered as an electromagnetic compression spring controlled by the current in coils within the actuator. When this actuator feature is employed, there is no need to use a mechanical spring to provide a repulsion force.

The present invention features a linear actuator comprising a field assembly and a coil assembly positioned for interaction with and movement relative to the field assembly, wherein the field assembly includes a soft magnetic housing, a plurality of axially magnetized cylindrical magnets positioned along an axis of and in the housing and spaced apart from one another by at least one soft magnetic pole piece, and wherein the coil assembly includes a coil base having a coil cavity and a coil positioned in the coil cavity, and an axially magnetized permanent magnet positioned on the coil base so that the axially magnetized permanent magnet is positioned to travel along the axis of the housing.

It is another feature of the present invention that a repulsion force is generated between the coil assembly and the field assembly when the coil assembly is de-energized, and the soft magnetic housing of the aforementioned field assembly has an overhang relative to the soft magnetic pole piece which affects the amount of repulsion force generated.

It is another feature of the present invention that a repulsion force is generated between the coil assembly and the field assembly when the coil assembly is de-energized, and wherein the magnitude of the repulsion force can be modified when the coil assembly is energized, and further wherein the soft magnetic housing of the aforementioned field assembly has an overhang relative to the soft magnetic pole piece which affects the magnitude of repulsion forces generated.

It is still another feature of one embodiment of the present invention that the above repulsion force supplied has a first direction when the coil assembly is energized at one level, and has a second direction, opposite the first direction, when the coil assembly is energized at a different level.

The present invention also features a linear actuator comprising a field assembly and a coil assembly positioned for interaction with and movement relative to the field assembly, wherein the field assembly includes a soft magnetic housing, a plurality of axially magnetized cylindrical magnets and a plurality of soft magnetic pole pieces which form a stack of alternating cylindrical magnets and pole pieces. The stack is positioned along an axis of and in the soft magnetic housing, so that one of the magnets is positioned against the soft magnetic base, and one of the pole pieces is located at a free end of the stack. The coil assembly includes a coil base having coil cavities, a plurality of coils supported in the coil cavity, and an axially magnetized permanent magnet positioned on the coil base so that the axially magnetized permanent magnet is positioned to travel along the axis of the soft magnetic housing.

These and other advantages and features of the present invention will be more readily understood upon consideration of the following detailed description of certain preferred embodiments of the invention and the accompanying drawings.

DETAILED DESCRIPTION OF THE PREFERRED EMBODIMENT OF THE PRESENT INVENTION

Figure 1:
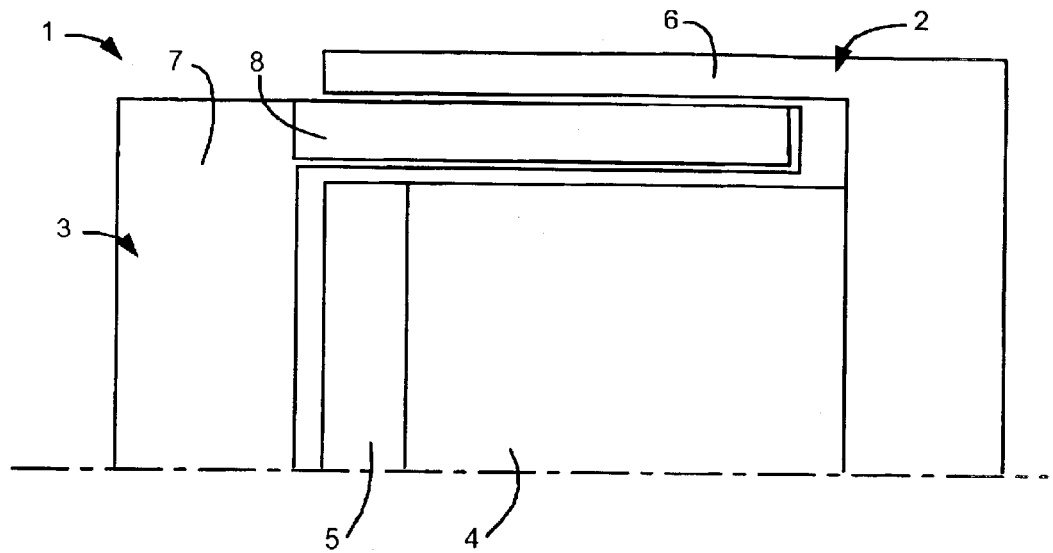
FIG. 1 provides a depiction of a typical linear voice coil actuator, shown in a one-half longitudinal cross section view.
Figure 2:
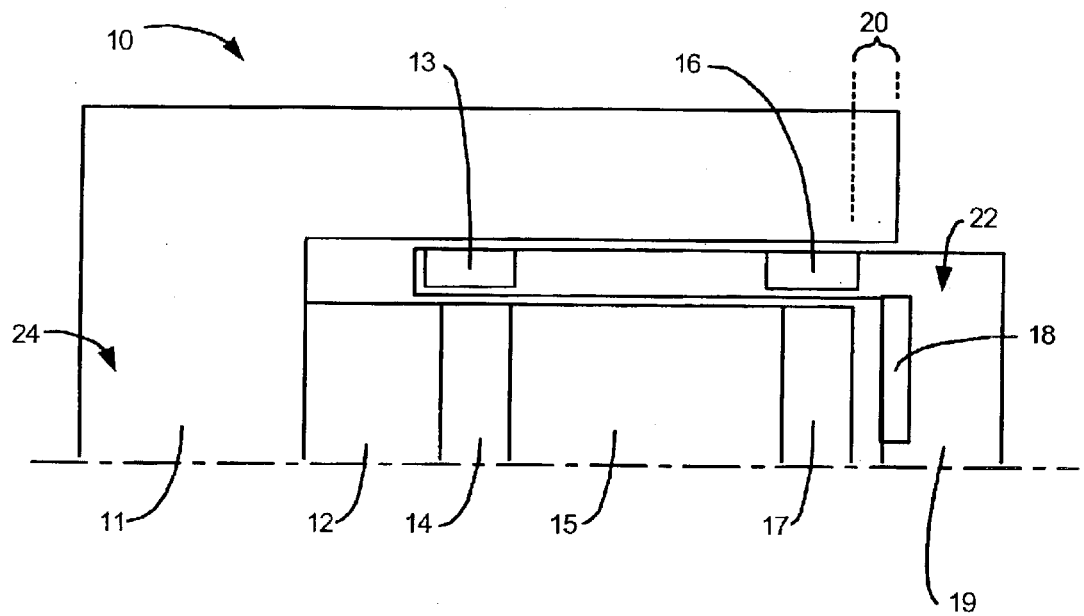
FIG. 2 depicts in one-half longitudinal cross section an example of a modification of a linear voice coil actuator in accordance with the present invention.

The linear voice coil actuator of the subject application provides a repulsion force so that it can operate as an electromagnetic compression spring controlled by currents in its coils. Referring to FIG. 2, depicted in a one-half longitudinal cross section, for example, is a modified version of a design that is disclosed in U.S. Pat. No. 5,345,206, assigned to BEI Electronics, Inc., the assignee of the subject application. U.S. Pat. No. 5,345,206 is hereby incorporated by reference into the subject application. In this modified design 10, the coil assembly 22 has an additional element: an axially magnetized permanent magnet 18 attached to the coil base 19. The linear voice coil actuator 10 is shown in a fully-in position. Because of this permanent magnet 18, the coil assembly 22 tends to move away (to the right) from the field assembly 24 as long as the winding (comprising coils 13 and 16) is not energized.

The distance that the coil assembly 22 moves is determined by the relationship between the repulsion force as a function of stroke and the friction in the system. Therefore, either a positive stop (not shown) should be provided or a system itself should limit the motion.

The repulsion force of this actuator 10 for the given position is affected by several variables: thickness of the magnet 18, its inside and outside diameters, the amount of the overhang 20 of the soft magnetic housing 11 relative a soft magnetic pole 17, and, generally, by the geometry of an actuator and by the characteristics of soft and hard magnetic materials from which the magnetic circuit of such an actuator is built.

When the coils are energized, the coil assembly 22 will remain in a fully-out position as long as the force created by interaction of the current in the coils 13 and 16 and the magnetic field generated by axially magnetized permanent magnets 12 and 15 is less or equal to the repulsion force created by an additional permanent magnet 18. Once this force becomes greater than the repulsion force, the coil assembly will move into the field assembly.

Figure 3:
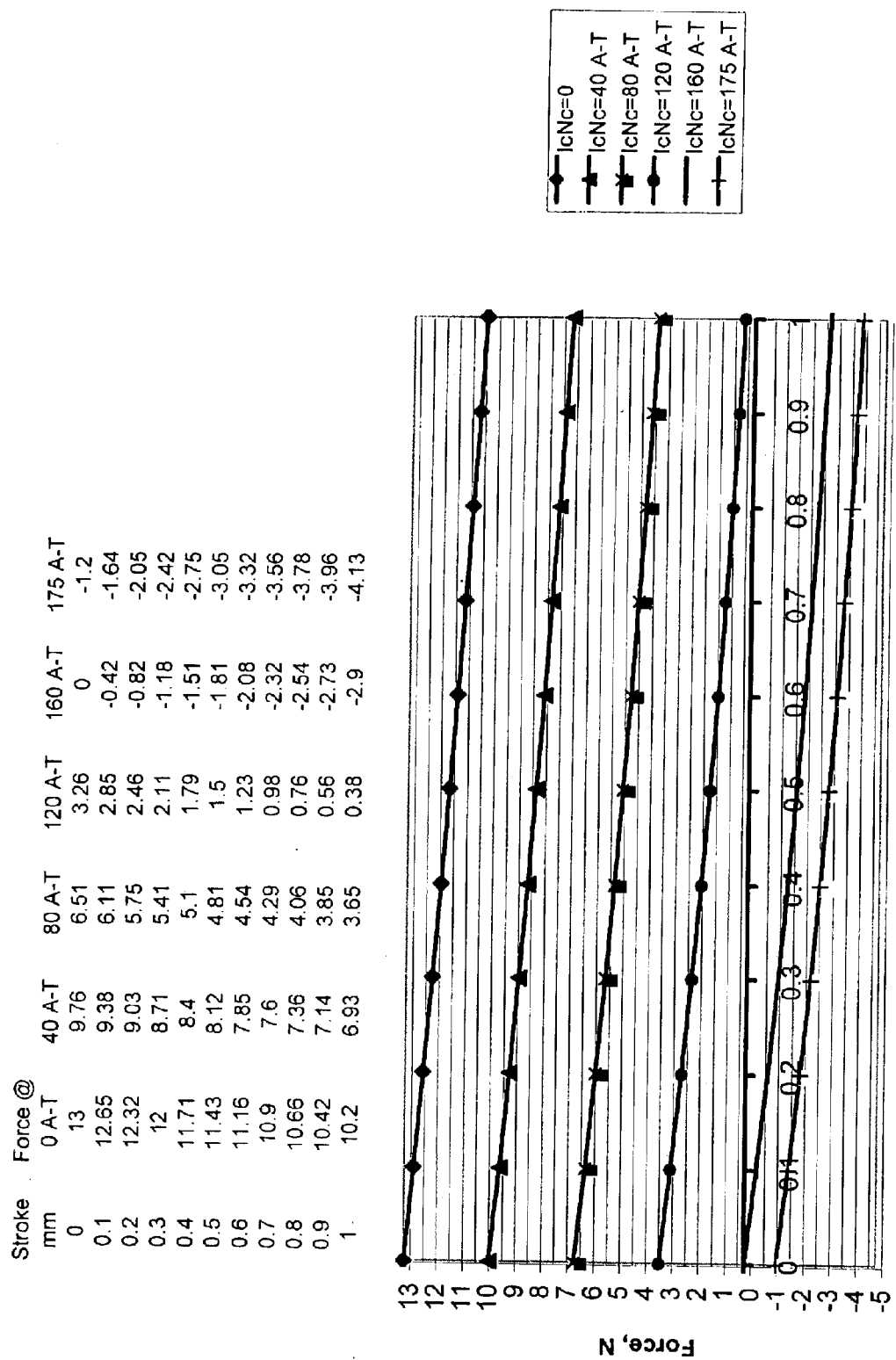
FIG. 3 shows a family of the force versus stroke characteristics of an actuator of the present invention at different numbers of Ampere-turns.

As an illustration to the above paragraph, FIG. 3 shows a family of the force vs. stroke characteristics of the actuator 10 of the present invention at different numbers of Ampere-turns. As can be appreciated from FIG. 3, when the coil assembly 22 of actuator 10 is not energized (0 A-T), the force at stroke position 0 mm has a value of 13, while the force at stroke position 1 mm has decreased to 10.2. Similarly, when the coil assembly 22 is energized 80A-T, the force at stroke position 0 mm is 6.51 and decreases to 3.65 at stroke position 1 mm. Thus, the actuator 10 acts like a compression spring with force being greatest at the end of travel for coil assembly 22, and least at the starting point of travel. For higher values of Ampere-turns applied to coil assembly 22, for example 160A-T or 175A-T, it can be seen that the actuator 10 acts to supply a force, which causes the coil assembly to move in opposite direction.

As can be appreciated from FIG. 3, one of the applications of the actuator of the present invention can be in a valve. When the coils are not energized, the valve is closed (e.g. in the 1 mm stroke position) and the actuator applies a force of 10.2N to keep the valve closed. It takes a certain amount of current in the winding (i.e. a certain number of Ampere-turns) to overcome the repulsion force (present in the actuator because of permanent magnet 18) and thereby open the valve. For example, for the actuator of FIG. 3, the minimum number of Ampere-turns which would be applied to keep the valve open throughout the stroke (from 1-mm position to 0-mm position) is 160.

To summarize, the present invention provides an actuator that can be considered as an electromagnetic compression spring controlled by the current in the coils. When this actuator feature is employed, there is no need in using a mechanical spring.

The terms and expressions which have been employed herein are terms of description and not of limitation, and there is no intent in the use of such terms and expressions of excluding equivalents of the features shown and described, or portions thereof, it being recognized that various modifications are possible within the scope of the invention claimed.

What is claimed is:

1. A linear actuator controllable as a spring comprising
a field assembly;
a coil assembly positioned for interaction with and movement relative to the field assembly;
wherein the field assembly includes
a soft magnetic housing;
a plurality of axially magnetized cylindrical magnets positioned along an axis of and in the soft magnetic housing and spaced apart from one another by at least one soft magnetic pole piece; and
wherein the coil assembly includes
a coil base having a coil cavity and a coil positioned in the coil cavity; and
an axially magnetized permanent magnet positioned on the coil base so that the axially magnetized permanent magnet is positioned to travel along the axis of the soft magnetic housing.

2. The linear actuator of claim 1, wherein a repulsion force is generated between the coil assembly and the field assembly when the coil assembly is de-energized, and the soft magnetic housing of the field assembly further includes an overhang relative to the soft magnetic pole piece which affects the repulsion force generated.

3. The linear actuator of claim 1, wherein a repulsion force is generated between the coil assembly and the field assembly when the coil assembly is de-energized, and wherein the repulsion force is modified when the coil assembly is energized, and further wherein the soft magnetic housing of the field assembly includes an overhang relative to the soft magnetic pole piece which affects the generated repulsion force and the modified repulsion force.

4. The linear actuator of claim 3, wherein the modified repulsion force has a first direction when the coil assembly is energized at one level, and has a second direction, opposite the first direction, when the coil assembly is energized at a different level.

5. A linear actuator controllable as a spring comprising
a field assembly;
a coil assembly positioned for interaction with and movement relative to the field assembly;
wherein the field assembly includes
a soft magnetic housing having a base;
a plurality of axially magnetized cylindrical magnets; and
a plurality of soft magnetic pole pieces positioned with respect to the cylindrical magnets to form a stack of alternating cylindrical magnets and soft magnetic pole pieces, wherein the stack is positioned along an axis of and in the soft magnetic housing, so that one of the cylindrical magnets is positioned against the base of the soft magnetic housing, and one of the soft magnetic pole pieces is located at a free end of the stack; and
wherein the coil assembly includes
a coil base having coil cavities;
a plurality of coils supported in the coil cavity; and
an axially magnetized permanent magnet positioned on the coil base so that the axially magnetized permanent magnet is positioned to travel along the axis of the soft magnetic housing.

6. The linear actuator of claim 1, 2, 3, 4, or 5, wherein the linear actuator is positioned in a valve.

7. A linear voice coil actuator operable as an electromagnetic compression spring comprising
a field assembly including a first axially magnetized permanent magnet positioned along an axis; and
a coil assembly having a base at one end and being open at an opposite end, and including a second axially magnetized permanent magnet positioned on the base for movement with the coil assembly along the axis and for interaction with the first permanent magnet, and a first coil positioned on the coil assembly for interaction with the first permanent magnet.

8. A linear voice coil actuator operable as an electromagnetic compression spring comprising
a field assembly including a first permanent magnet positioned along an axis; and a coil assembly having a base, a second permanent magnet positioned on the base for movement along the axis and for interaction with the first permanent magnet, and a first coil positioned on the coil assembly for interaction with the first permanent magnet; and further wherein the field assembly includes a soft magnetic housing having a base, a third permanent magnet and first and second soft magnetic pole piece that are positioned alternately with the first and third permanent magnets to form a stack positioned in the housing and on the base along the axis; and the coil assembly includes a coil base that supports the first coil for interaction with the first permanent magnet, and supports the second permanent magnet with respect to a free end of the stack, the coil assembly further including a second coil supported for interaction with the third permanent magnet.

9. A linear voice coil actuator operable as an electromagnetic compression spring comprising a field assembly including a first permanent magnet positioned along an axis; and a coil assembly having a base, a second permanent magnet positioned on the base for movement along the axis and for interaction with the first permanent magnet, and a first coil positioned on the coil assembly for interaction with the first permanent magnet; wherein the field assembly further includes a pole piece positioned on the first permanent magnet and a soft magnetic housing supporting the first permanent magnet and pole piece, and having an overhang relative to the soft magnetic pole piece which affects a repulsion force generated between the coil assembly and the field assembly when the coil assembly is de-energized.

10. A linear voice coil actuator operable as an electromagnetic compression spring comprising a field assembly including a first permanent magnet positioned along an axis; and a coil assembly having a base, a second permanent magnet positioned on the base for movement along the axis and for interaction with the first permanent magnet, and a first coil positioned on the coil assembly for interaction with the first permanent magnet; wherein a repulsion force is generated between the coil assembly and the field assembly when the coil assembly is de-energized, and wherein the repulsion force is modified when the coil assembly is energized, and further wherein the field assembly includes a soft magnetic housing having an overhang relative to a soft magnetic pole piece positioned on the first permanent magnet which affects the generated and modified repulsion forces.

11. A linear voice coil actuator operable as an electromagnetic compression spring comprising a field assembly including a first permanent magnet positioned along an axis; and a coil assembly having a base, a second permanent magnet positioned on the base for movement along the axis and for interaction with the first permanent magnet, and a first coil positioned on the coil assembly for interaction with the first permanent magnet; wherein the modified repulsion force has a first direction when the coil assembly is energized at one level, and a second direction, opposite the first direction, when the coil assembly is energized at a different level.

12. The linear actuator of claim 7, 8, 9, 10, or 11, wherein the linear actuator is positioned in a valve.

* * * * *